US011041341B1

(12) United States Patent
Harris et al.

(10) Patent No.: US 11,041,341 B1
(45) Date of Patent: Jun. 22, 2021

(54) LADDER STABILIZING SYSTEM AND METHOD

(71) Applicants: Ron Harris, Gig Harbor, WA (US); Brad Bodenman, Gig Harbor, WA (US)

(72) Inventors: Ron Harris, Gig Harbor, WA (US); Brad Bodenman, Gig Harbor, WA (US)

(*) Notice: Subject to any disclaimer, the term of this patent is extended or adjusted under 35 U.S.C. 154(b) by 0 days.

(21) Appl. No.: 15/931,143

(22) Filed: May 13, 2020

Related U.S. Application Data

(60) Provisional application No. 62/847,556, filed on May 14, 2019.

(51) Int. Cl.
*E06C 1/12* (2006.01)
*E06C 7/18* (2006.01)
*F16M 13/02* (2006.01)

(52) U.S. Cl.
CPC .............. *E06C 7/188* (2013.01); *E06C 1/12* (2013.01); *F16M 13/02* (2013.01)

(58) Field of Classification Search
CPC ...................................... E06C 7/188
USPC ....................................... 182/206
See application file for complete search history.

(56) References Cited

U.S. PATENT DOCUMENTS

| | | | | |
|---|---|---|---|---|
| 1,658,191 A | * | 2/1928 | Gravning | E06C 7/48 |
| | | | | 182/206 |
| 3,780,829 A | * | 12/1973 | Wallingford | E06C 1/36 |
| | | | | 182/206 |
| 4,483,416 A | * | 11/1984 | Garcia | E06C 7/48 |
| | | | | 182/107 |
| 10,415,312 B1 | * | 9/2019 | Conroy | E06C 7/488 |
| 2005/0284703 A1 | * | 12/2005 | Deuer | E06C 7/186 |
| | | | | 182/206 |
| 2014/0174853 A1 | * | 6/2014 | Charlton | E06C 7/188 |
| | | | | 182/107 |
| 2014/0367194 A1 | * | 12/2014 | Bolinski | E06C 7/188 |
| | | | | 182/107 |
| 2016/0024843 A1 | * | 1/2016 | Niemela | E06C 1/381 |
| | | | | 182/129 |

(Continued)

FOREIGN PATENT DOCUMENTS

| | | | | |
|---|---|---|---|---|
| EP | 3002407 B1 | * | 3/2017 | E06C 7/188 |
| FR | 3054592 A1 | * | 2/2018 | E06C 7/18 |

OTHER PUBLICATIONS

GrabCAD Community, "Pneumatic Gripper", Published Dec. 28, 2014, https://grabcad.com/library/pneumatic-gripper-4, retrieved May 7, 2020.

*Primary Examiner* — Alvin C Chin-Shue

(57) ABSTRACT

A system includes a clamp that includes a first arm, a second arm, and a threaded rod coupled to the first arm and the second arm. The threaded rod is configured to be substantially vertical when the clamp is clamped to the static structure. The clamp is configured to, while the user on a ground surface and in response to the nut being rotated about the threaded rod, a first jaw is urged towards a second jaw such that the static structure is clamped between the first jaw and the second jaw. The system further includes a first bracket configured to be releasably affixed to an upper portion of a first side rail of a base station of an extension ladder, and a second bracket that is configured to be releasably affixed to a lower portion of the first side rail of the base station of the extension ladder.

9 Claims, 17 Drawing Sheets

(56) References Cited

U.S. PATENT DOCUMENTS

2018/0051515 A1\* 2/2018 Crawford ................ E06C 7/188
2019/0281812 A1\* 9/2019 Lee .......................... E06C 7/16

\* cited by examiner

LADDER STABILIZING SYSTEM AND METHOD

CROSS-REFERENCE TO RELATED APPLICATIONS

This present application claims priority to U.S. Provisional Application Ser. No. 62/847,556, entitled "Ladder Stabilizing System and Related Methods," filed on May 14, 2019. The above-referenced application is hereby incorporated by reference for all purposes.

BACKGROUND

Climbing a ladder includes inherent risks such as losing one's balance and falling. In some instances, the ladder is placed against a structure. However, the ladder is not secured against the structure. When a user climbs the unsecured ladder, the ladder may slip to the side and cause the user to lose their balance and fall.

In some conventional ladder stabilizing systems, a ladder is placed against an object and the ladder is initially unsecured with the object. To secure the ladder, a user is required to climb the unsecured ladder and secure the ladder to the object while the user is at the top of the ladder. In other words, a user is required to climb an unstable ladder and stabilize the unstable ladder while standing on a rung near the top of the unstable ladder. As such, the user is at risk of injury from falling off of the unstable and unsecured ladder.

BRIEF DESCRIPTION OF DRAWINGS

The present description will be understood more fully from the detailed description given below and from the accompanying drawings of various embodiments of the present embodiment, which description is not to be taken to limit the present embodiment to the specific embodiments but are for explanation and understanding. Throughout the description the drawings may be referred to as drawings, figures, and/or FIGS.

DETAILED DESCRIPTION

Figure 1A:
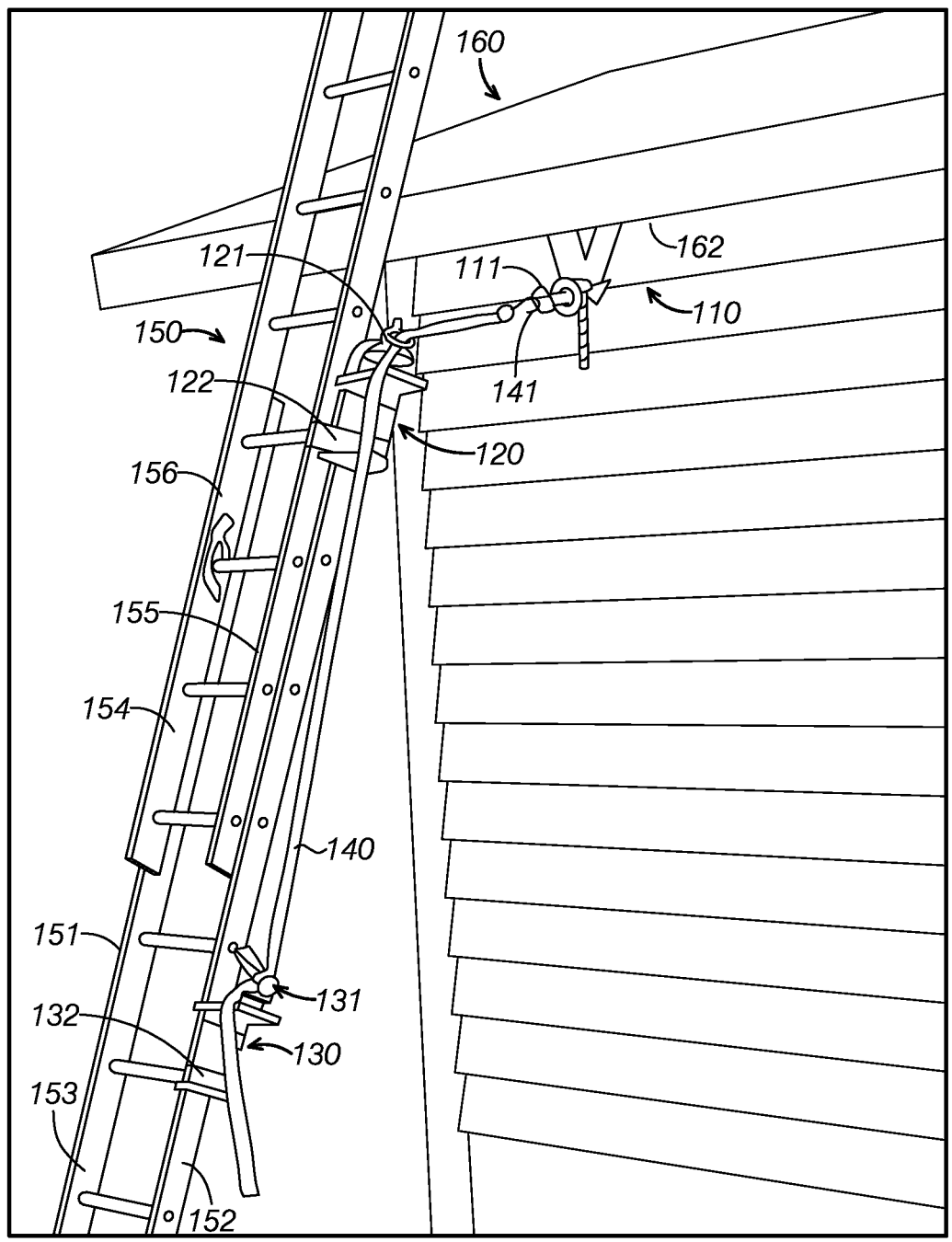
FIG. 1A illustrates a perspective view of a system for stabilizing a ladder, according to an embodiment.

Methods, devices and systems related to stabilizing a ladder as disclosed herein will become better understood through a review of the following detailed description in conjunction with the figures. The detailed description and figures provide merely examples of the various embodiments described herein. Those skilled in the art will understand that the disclosed examples may be varied, modified, and altered and not depart from the scope of the embodiments described herein. Many variations are contemplated for different applications and design considerations; however, for the sake of brevity, the contemplated variations may not be individually described in the following detailed description.

Throughout the following detailed description, example embodiments of various methods, devices and systems for to stabilizing a ladder are provided. Related elements in the example embodiments may be identical, similar, or dissimilar in different examples. For the sake of brevity, related elements may not be redundantly explained in multiple examples except to highlight dissimilar features. Instead, the use of a same, similar, and/or related element names and/or reference characters may cue the reader that an element with a given name and/or associated reference character may be similar to another related element with the same, similar, and/or related element name and/or reference character in an example embodiment explained elsewhere herein. Elements specific to a given example may be described regarding that particular example embodiment.

A person having ordinary skill in the art will understand that a given element need not be the same and/or similar to the specific portrayal of a related element in any given figure or example embodiment in order to share features of the related element. As used herein "same" means sharing all features and "similar" means sharing a substantial number of features or sharing materially important features even if a substantial number of features are not shared. As used herein "may" should be interpreted in the permissive sense and should not be interpreted in the indefinite sense. Additionally, use of "is" regarding embodiments, elements, and/or features should be interpreted to be definite only regarding a specific embodiment and should not be interpreted as definite regarding the invention as a whole. Furthermore, references to "the disclosure" and/or "this disclosure" refer to the entirety of the writings of this document and the entirety of the accompanying illustrations, which extends to all the writings of each subsection of this document, including the Title, Background, Brief description of the Drawings, Detailed Description, Claims, and Abstract.

Where multiples of a particular element are shown in a FIG., and where it is clear that the element is duplicated throughout the FIG., only one label may be provided for the element, despite multiple instances of the element being present in the FIG. Accordingly, other instances in the FIG. of the element having identical or similar structure and/or function may not be redundantly labeled. A person having ordinary skill in the art will recognize based on the disclosure herein redundant and/or duplicated elements of the same FIG. Despite this, redundant labeling may be included where helpful in clarifying the structure of the depicted example embodiments.

As used herein regarding a list, "and" forms a group inclusive of all the listed elements. For example, an embodiment described as including A, B, C, and D is an embodiment that includes A, includes B, includes C, and also includes D. As used herein regarding a list, "or" forms a list of elements, any of which may be included. For example, an embodiment described as including A, B, C, or D is an embodiment that includes any of the elements A, B, C, and D. Unless otherwise stated, an embodiment including a list of alternatively-inclusive elements does not preclude other embodiments that include various combinations of some or all of the alternatively-inclusive elements. An embodiment described using a list of alternatively-inclusive elements includes at least one element of the listed elements. However, an embodiment described using a list of alternatively-inclusive elements does not preclude another embodiment that includes all of the listed elements. And, an embodiment described using a list of alternatively-inclusive elements does not preclude another embodiment that includes a combination of some of the listed elements. As used herein regarding a list, "and/or" forms a list of elements inclusive alone or in any combination. For example, an embodiment described as including A, B, C, and/or D is an embodiment that may include: A alone; A and B; A, B and C; A, B, C, and D; and so forth. The bounds of an "and/or" list are defined by the complete set of combinations and permutations for the list.

Conventional ladder stabilizing systems may require a user to climb an unstable ladder to stabilize the ladder. The climbing of an unstable ladder may increase the likelihood that, the user will fall from the ladder and injure themselves from the fall.

Implementations of the disclosure address the above-mentioned deficiencies and other deficiencies by providing methods, systems, devices, or apparatuses for stabilizing a ladder. In one embodiment, a first bracket is attached to an upper portion of a first side rail of a ladder and a second bracket is attached to a lower portion of the first side rail of the ladder. While the ladder is not propped up against an object, a strap is disposed through a ring of the first bracket and a ratchet of the second bracket. While the user is on a ground surface, an end of the strap is coupled to a clamp and a threaded rod of a clamp is disposed in an extension pole. The clamp is then lifted, via the extension pole, to the object above the ground surface. The clamp is then clamped to the object by rotating the extension pole in a first direction while the threaded rod is disposed within the extension pole. The ladder is then secured against the object by generating tension on the strap, via the strap ratchet. The tension draws the ladder towards the object and secures the ladder against the object while the user is on the ground surface.

FIG. 1A illustrates a perspective view of a system 100A for stabilizing a ladder, according to an embodiment. System 100A includes a ladder 150, a clamp 110, a first bracket 120, a second bracket 130, and a strap 140.

The ladder 150 may be stabilized or secured against a roof 160. The ladder 150 may be any type of ladder that may be stabilized against an object such as a roof. In one embodiment, the ladder 150 is an extension ladder that includes a base station (or base) 151 that includes a first rail 152 and a second rail 153. A fly 154 is slidably connected to the base 151. The fly 154 is the portion of the ladder 150 that translates with respect to the base 151 and extends the length of the ladder. The fly 154 includes a third rail 155 that slides along rail 152 and a fourth rail 156 that slides along the rail 153.

A clamp 110 may be clamped to a rafter 162 of roof 160. In various embodiments, the clamp 110 may be clamped to any structure such that the ladder is safely stabilized. For example, the structure may be a roof, a rafter, a gutter and the like.

A first bracket 120 (also referred to herein as an upper bracket 120) is coupled to a first rail 152 of the ladder 150. In various embodiments, the first bracket 120 is coupled to both the first rail 152 and third rail 155. In another embodiment, the first bracket 120 is coupled to the third rail 155 and not the first rail 152. In various embodiments, the first bracket 120 is coupled to the ladder 150 (e.g., the first rail 152 and/or the third rail 155) via a strap 122 (e.g., a velcro strap) or any other coupling mechanism.

A second bracket 130 (also referred to herein as a lower bracket 130) is coupled to a first rail 152 of the ladder 150. In various embodiments, the second bracket 130 is coupled the first rail 152. In another embodiment, the first bracket 120 is coupled to the first rail 152 and the third rail 155. In various embodiments, the first bracket 120 is coupled to the ladder 150 (e.g., the first rail 152 and/or the third rail 155) via a strap 132 (e.g., a velcro strap) or any other coupling mechanism.

A strap 140 includes a hook 141 that is releasably coupled to the clamp 110. In one embodiment, the strap 140 includes a hook 141 at an end of the strap 140 that is releasably coupled to a ring 111 of clamp 110. The strap 140 may pass through a ring 121 of the bracket 120 and through a ratchet 131 of the bracket 130. The ratcheting of the ratchet 131 generates tension on the strap 140. Accordingly, the tension on the strap 140 draws the ladder 150 towards the roof 160 and secures the ladder 150 against the roof 160 while the user is on the ground surface. In various embodiments, the strap 140 may be a rope, a webbing and the like.

Figure 1B:
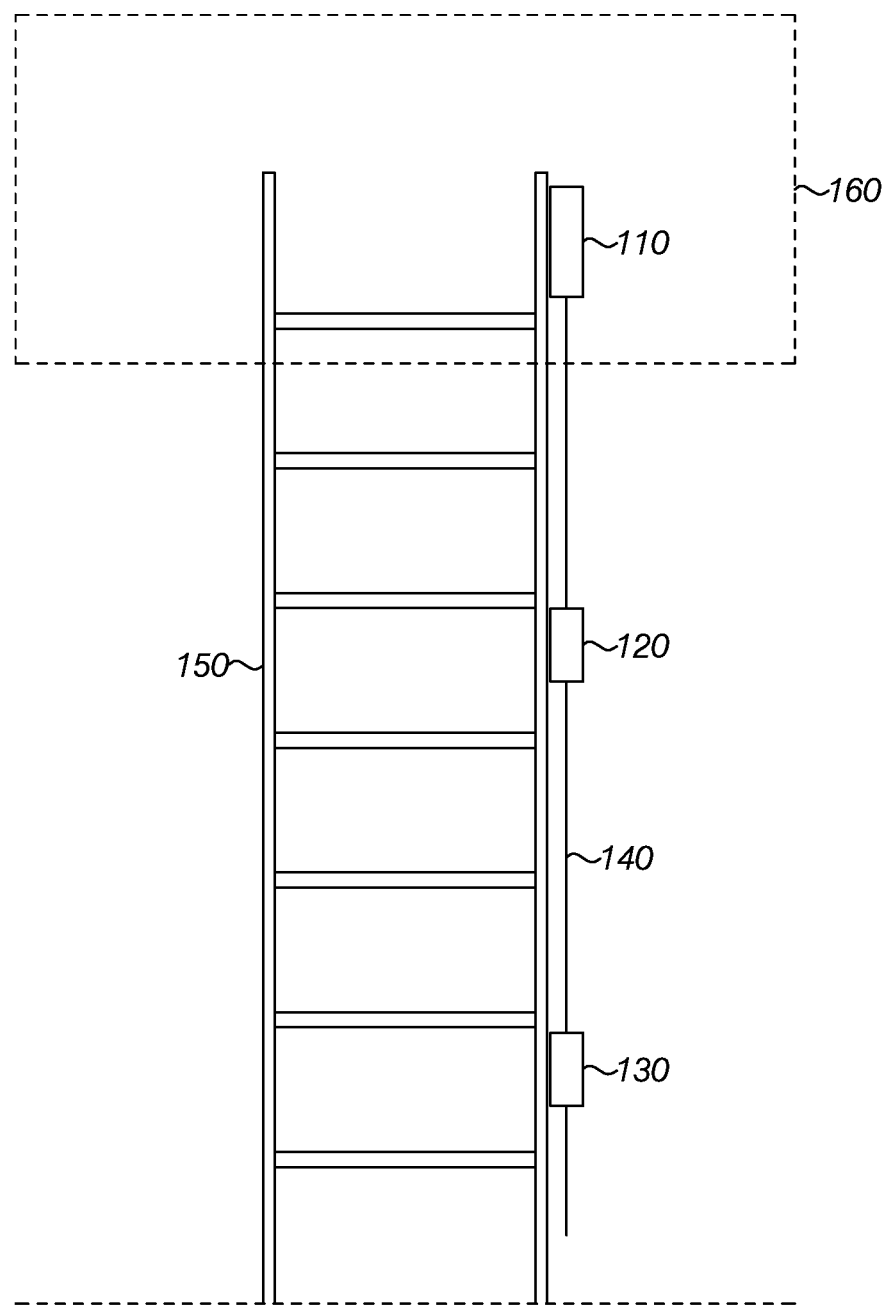
FIG. 1B illustrates a front view of a system depicted in FIG. 1A, according to an embodiment.

FIG. 1B illustrates a front view of the system 100A depicted in FIG. 1A, according to an embodiment. Some of the features in FIG. 1B are the same as or similar to some of the features in FIG. 1A as noted by same and/or similar reference characters, unless expressly described otherwise. Furthermore, the elements and/or features described regarding FIG. 1B may be the same as and/or similar to other similarly named elements and/or features described and/or illustrated throughout this disclosure.

FIG. 1B illustrates a ladder 150 resting on the ground surface 170 and leaning against a roof 160. In particular, the ladder 150 is stabilized against the roof 160. For example, a tension is created on strap 140 such that the ladder 150 is secured against the roof 160.

In one embodiment, the clamp 110, the bracket 120 and the bracket 130 are substantially laterally aligned. As such, the tension of strap 140 draws the ladder into the roof 160 and does not induce any lateral force or minimally induces a lateral force (e.g., a force in the left or right direction) on the ladder to pull the ladder laterally with respect to the roof 160.

In one embodiment, while the ladder 150 is on the ground (e.g., laying down and not propped up), a user secures clamp 110 to a secure structure (e.g., on an eave of roof 160). A user secures the clamp 110, while standing on the ground (and not while the ladder is propped up against the house), to the roof 160. The user secures the clamp by way of an extension pole. Prior to securing the clamp 110, the strap 140 is connected to the clamp 110 and is passed through at least the upper bracket 120. As such, when the clamp 110 is secured, the strap 140 hangs from the clamp 110 and extends through the upper bracket 120.

While the strap 140 is connected to the clamp 110 and extends through the upper bracket 120, the ladder 150 is propped up into position against the roof 160. Upon the ladder 150 appropriately positioned against the roof 160, the strap 140 is engaged with the lower bracket 130 via a ratchet. The user, while standing on the ground, ratchets the strap 140 so that it is taut between the clamp 110, the upper bracket 120 and the lower bracket 130. Upon the strap 140 being taut, the ladder 150 is secured and stabilized against the roof 160. Specifically, the tension of strap 140 (from the clamp 110 through the upper bracket 120 and to the lower bracket 130) pulls the ladder 150 securely against the roof 160.

Figure 1C:
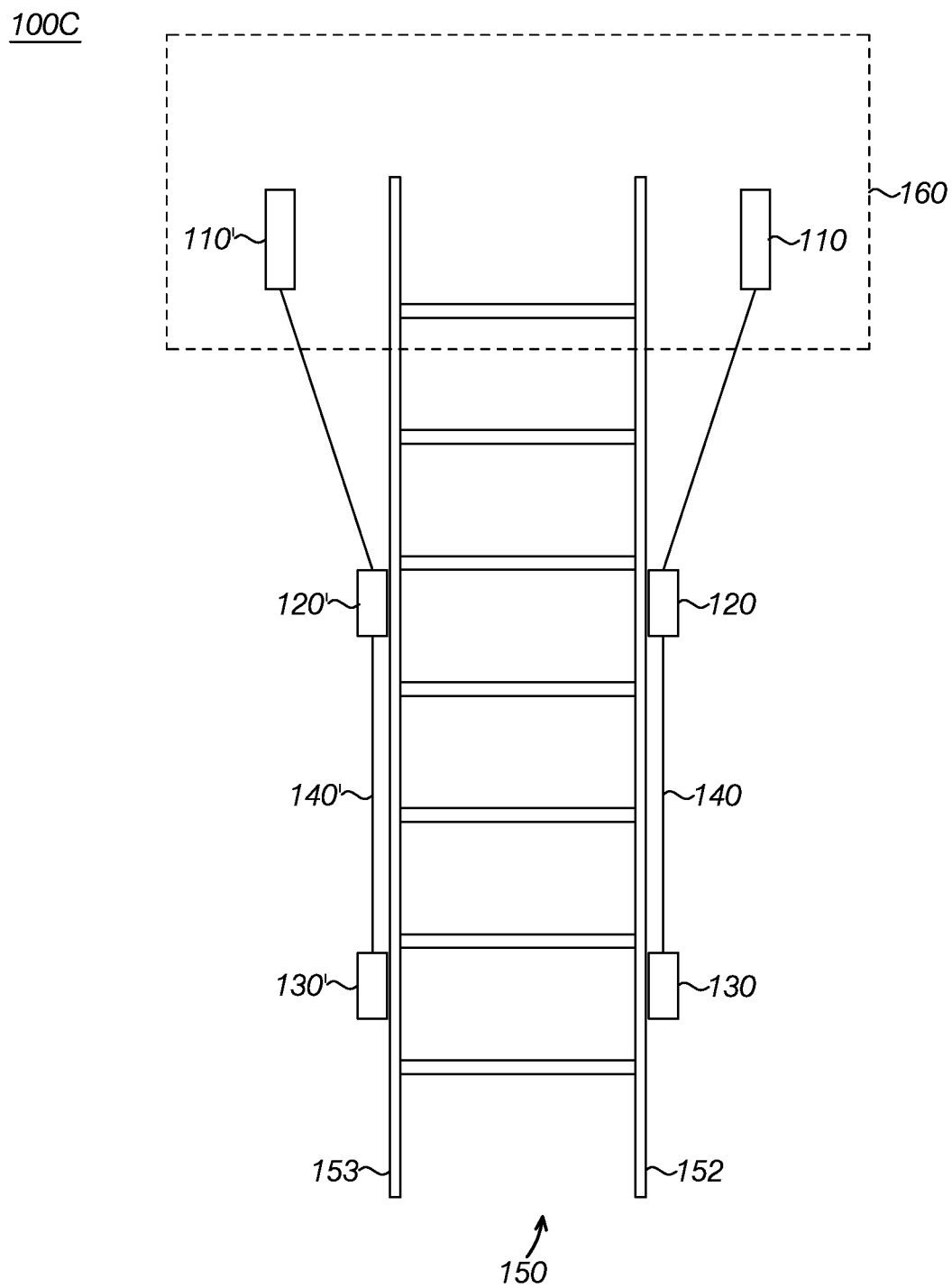
FIG. 1C illustrates a front view of a system for stabilizing a ladder, according to an embodiment.

FIG. 1C illustrates a front view of the system 100C, according to an embodiment. Some of the features in FIG. 1C are the same as or similar to some of the features in FIGS. 1A-B as noted by same and/or similar reference characters, unless expressly described otherwise. Furthermore, the elements and/or features described regarding FIG. 1C may be the same as and/or similar to other similarly named elements and/or features described and/or illustrated throughout this disclosure.

FIG. 1C illustrates ladder 150 resting on the ground surface 170 and leaning against roof 160. In various embodiments, the clamp 110 is clamped to roof 160, the first bracket 120 is coupled to a first rail 152 and the second bracket 130 is coupled to the first rail 152. Similarly, the clamp 110' is clamped to roof 160, a third bracket 120' is coupled to second rail 152 and a fourth bracket 130' is coupled to the second rail.

A first tension is created in strap 140 such that the ladder 150 is secured against the roof 160. Similarly, a second tension is created in strap 140' such that the ladder 150 is further secured against the roof 160.

In one embodiment, the clamp 110 is laterally offset from one of the first bracket 120 and the second bracket 130 which may cause a lateral force, in a first direction, to act on the ladder 150. However, the clamp 110' is laterally offset from one of the third bracket 120' and the fourth bracket 130' which may cause a lateral force, in an opposite second direction, to act on the ladder 150. The opposing forces in the first direction and the second direction cancel one another and therefore there is no lateral force acting on the ladder or a limited lateral force acts on the ladder. As such, the ladder 150 is drawn into the roof 160 and is stabilized against the roof 160.

Figure 2A:
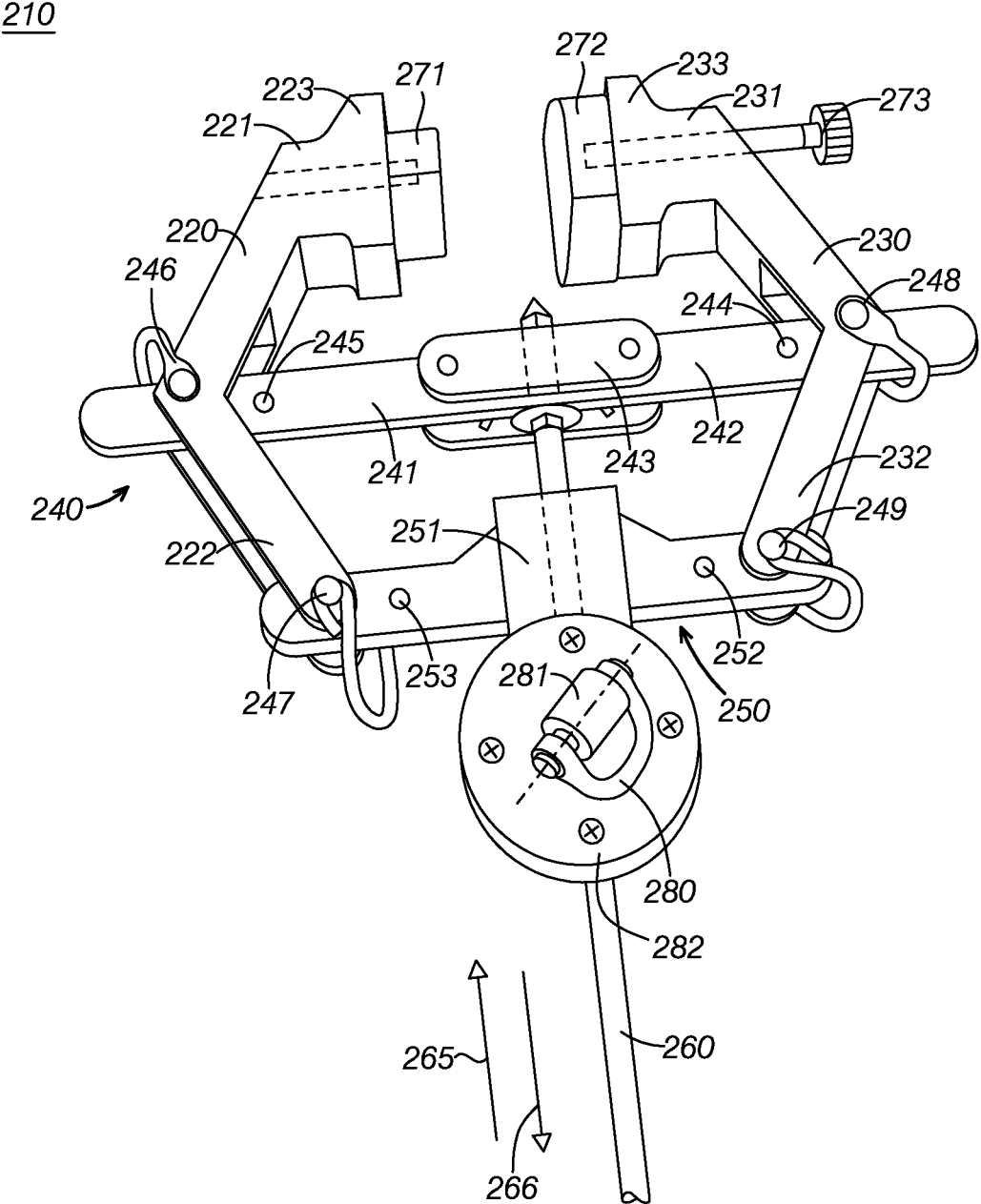
FIG. 2A illustrates a front perspective view of a clamp in the system depicted in FIG. 1A, according to an embodiment.

FIG. 2A illustrates a front perspective view of a clamp 210 in the system depicted in FIG. 1A, according to an embodiment. Some of the features in FIG. 2A are the same as or similar to some of the features in FIGS. 1A-C as noted by same and/or similar reference characters, unless expressly described otherwise. Furthermore, the elements and/or features described regarding FIG. 2A may be the same as and/or similar to other similarly named elements and/or features described and/or illustrated throughout this disclosure.

The clamp 210 includes a first arm 220 and a second arm 230 opposite the first arm 220. The first arm 220 includes a first jaw 223 at an end 221. The second arm 230 includes a second jaw 233 at end 231.

The clamp 210 includes a first crossbar 240 disposed between the first arm 220 and the second arm 230. The first crossbar 240 includes a first portion 241 releasably and rotatably coupled to a mid-portion of the first arm. The first crossbar 240 includes a second portion 242 releasably and rotatably coupled to a mid-portion of the second arm 230. The first crossbar 240 includes a middle portion 243. The middle portion 243 is rotatably coupled to the first portion 241 and the second portion 242.

The clamp 210 includes a second crossbar 250 disposed between the first arm 220 at the end 222 of the first arm 220 and the second arm 230 at the end 232 of the second arm 230. The second crossbar 250 is rotatably and releasably coupled to the end 222 of the first arm 220 and is rotatably and releasably coupled to the end 232 of the second arm 230.

The clamp 210 includes a threaded rod 260 that is rotatably coupled to the first crossbar at the middle portion 243. The threaded rod 260 passes through (and does not threadably engage) the second crossbar 250. In one embodiment, the second crossbar 250 includes a block 251 where the threaded rod passes through a through-hole of block 251.

In one embodiment, a nut (e.g., a wing nut) is threadably engaged with the threaded rod 260. As the nut travels along the threaded rod 260, in the direction 265, the nut abuts the second crossbar 250, for example, at block 251. While the nut abuts the second crossbar 250 and continues to travel along the threaded rod, in direction 265, (1) the second crossbar moves in the direction 265, and (2) the first crossbar 240 is drawn towards the second crossbar 250 in direction 266. As a result, the first jaw 223 and the second jaw 233 are drawn towards each other and clamp onto an object (e.g., a rafter) located between the first jaw 223 and the second jaw 233.

To loosen the clamp 210 or, in other words, to unclamp the clamp 210 from the object between the first jaw 223 and the second jaw 233, the nut is rotated in an opposite direction such that it travels in the direction 266 along the threaded rod 260. As such, the first jaw 223 and the second jaw 233 are drawn away from one another.

In various embodiments, the clamp includes a pair of grip pads 271 and 272 for "gripping" onto the object disposed between the first jaw 223 and the second jaw 233. That is, the grip pads 271 and 272 are for increasing the grip or friction between the clamp and the object that the clamp clamps on to. In one embodiment, the grip pad 272 is releasably coupled to the first jaw 223 and the grip pad 272 is releasably coupled to the second jaw 233. For example, the grip pads are coupled to the respective jaws via a bolt, such as bolt 273.

In various embodiments, the grip pads 271 and 272 are selected based on the material of the object that the clamp clamps onto. For example, a first pair of pads may include material conducive for gripping to wood, and a second pair of pads may include a material conducive for gripping to another material such as metal, glass, etc.

In various embodiments, the clamp 210 may be adjusted to accommodate different ranges of widths for an object that the clamp 210 clamps onto. In particular, the first arm 220 and the second arm 230 may be adjusted at different locations on the crossbars to accommodate different sizes of objects. For example, as depicted in FIG. 2A, the first arm 220 and the second arm 230 are adjusted to accommodate a first size (or range of widths) of objects. In various embodiments, the first portion 241 of the first crossbar 240 includes a hole 245 and the second portion 242 of the first crossbar 240 includes a hole 244. Similarly, the second crossbar 250 includes a hole 253 and a hole 252.

Accordingly, the first arm 220 can be moved from a first position (with respect to the first crossbar and the second crossbar) to a second position, where the first arm 220 is connected to the first crossbar at hole 245 and to the second crossbar at hole 253. Similarly, the second arm 230 can be moved from a first position (with respect to the first crossbar and the second crossbar) to a second position, where the second arm 230 is connected to the first crossbar at hole 244 and to the second crossbar at hole 252. As such, the first arm 220 and the second arm 230 are placed closer to one another to accommodate the clamping of smaller objects.

In various embodiments, the first arm 220 is releasably and rotatably coupled to the first crossbar 240 via pin 246. The first arm 220 is releasably and rotatably coupled to the second crossbar 250 via pin 247. Similarly, the second arm 230 is releasably and rotatably coupled to the first crossbar 240 via pin 248. The second arm 230 is releasably and rotatably coupled to the second crossbar 250 via pin 249.

The clamp 210 includes a ring 280 configured to be releasably coupled to an end of the strap. For example, a hook at the end of the strap is coupled to the ring 280. The ring 280 can rotate about two perpendicular axes. For example, the ring 280 may rotate 360 degrees about a first axis (e.g., an axis going into or out of the page) and the ring 280 may rotate about a second axis 281.

In one embodiment, a plate 282 is coupled to the second crossbar 250. Additionally, the ring 280 is rotatably coupled to the plate 282.

Figure 2B:
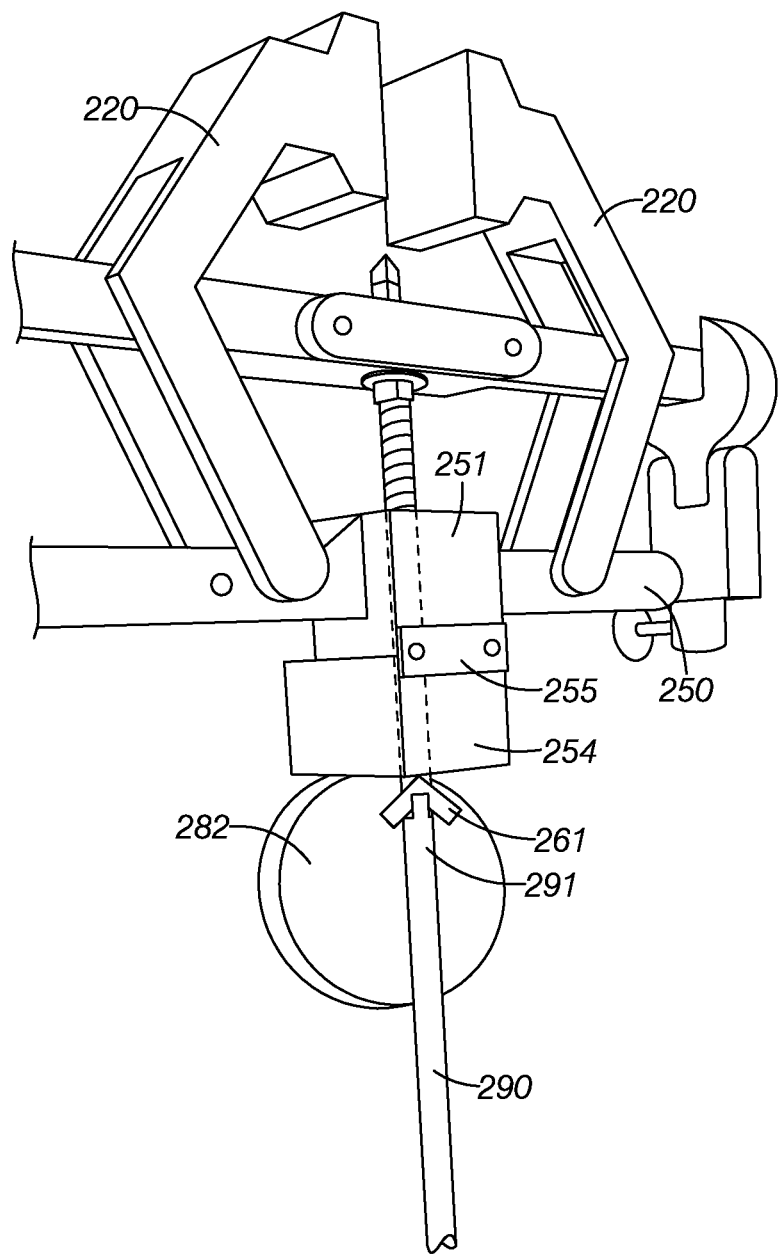
FIG. 2B illustrates a back perspective view of a clamp in FIG. 2A, according to an embodiment.

FIG. 2B illustrates a back perspective view of a clamp 210, according to an embodiment. Some of the features in FIG. 2B are the same as or similar to some of the features in FIGS. 1A-2A as noted by same and/or similar reference characters, unless expressly described otherwise. Furthermore, the elements and/or features described regarding FIG. 2B may be the same as and/or similar to other similarly named elements and/or features described and/or illustrated throughout this disclosure.

In various embodiments, the clamp 210 includes a block 254 that is coupled to a block 251 via plate 255. In particular, the threaded rod 260 is disposed through the block 254 and through the block 251. The plate 282 is coupled to the block 254.

The threaded rod 260 is disposed within an extension pole 290. A distal end 291 of the extension pole 290 engages with the wings of the nut 261. As such, the nut 261 may rotate in response to rotation of the extension pole 290.

Figure 2C:
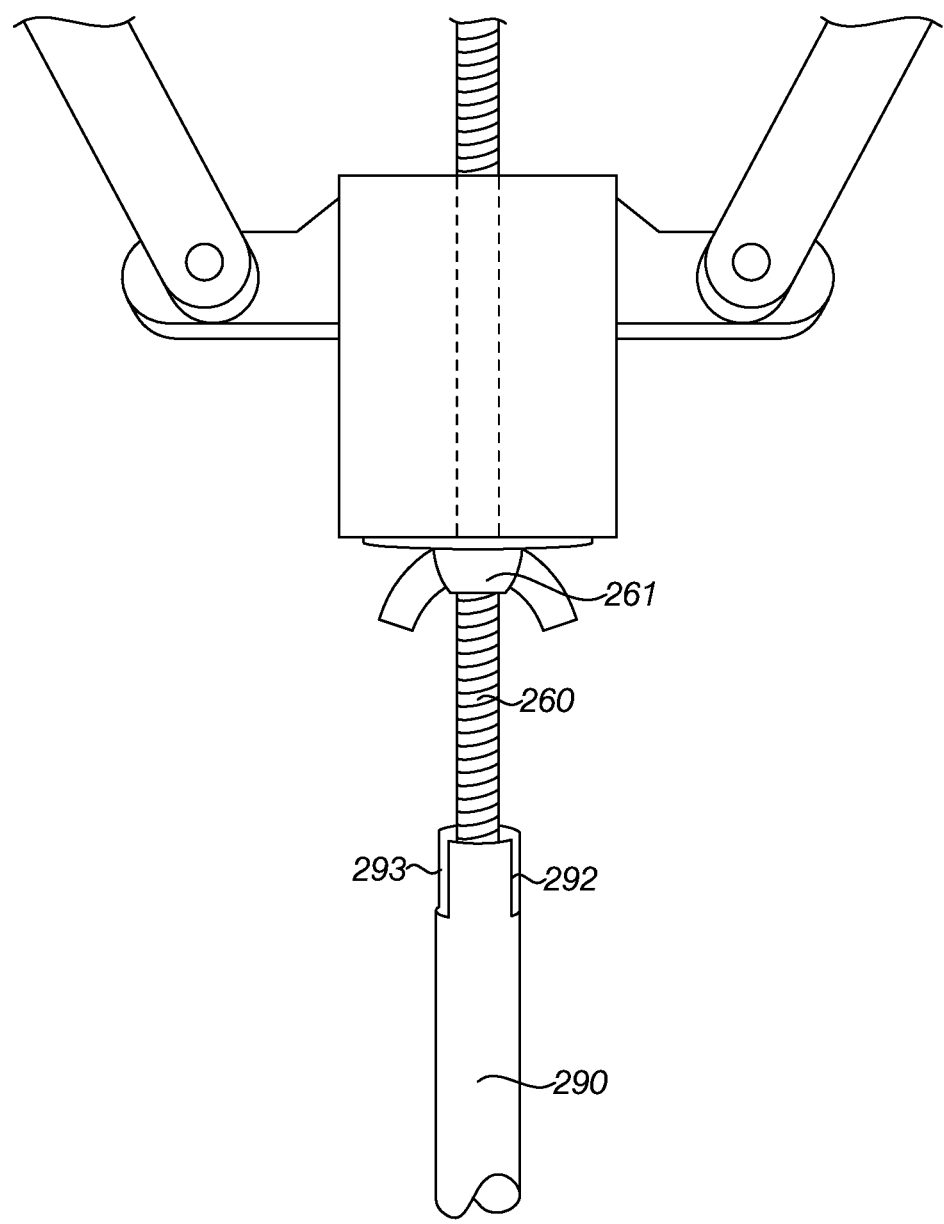
FIG. 2C illustrates a portion of the clamp in FIG. 2A physically engaged with an extension pole, according to an embodiment.

FIG. 2C illustrates a portion of the clamp 210 in FIG. 2A physically engaged with an extension pole, according to an embodiment. Some of the features in FIG. 2C are the same as or similar to some of the features in FIGS. 1A-2B as noted by same and/or similar reference characters, unless expressly described otherwise. Furthermore, the elements and/or features described regarding FIG. 2C may be the same as and/or similar to other similarly named elements and/or features described and/or illustrated throughout this disclosure.

In various embodiments, the threaded rod 260 is inserted into an end of extension pole 290. The extension pole 290 includes a first aperture 292 and a second aperture 293 that are configured to receive respective wings of nut 261. As such, the nut 261 may rotate in response to rotation of the extension pole 290.

Figure 3A:
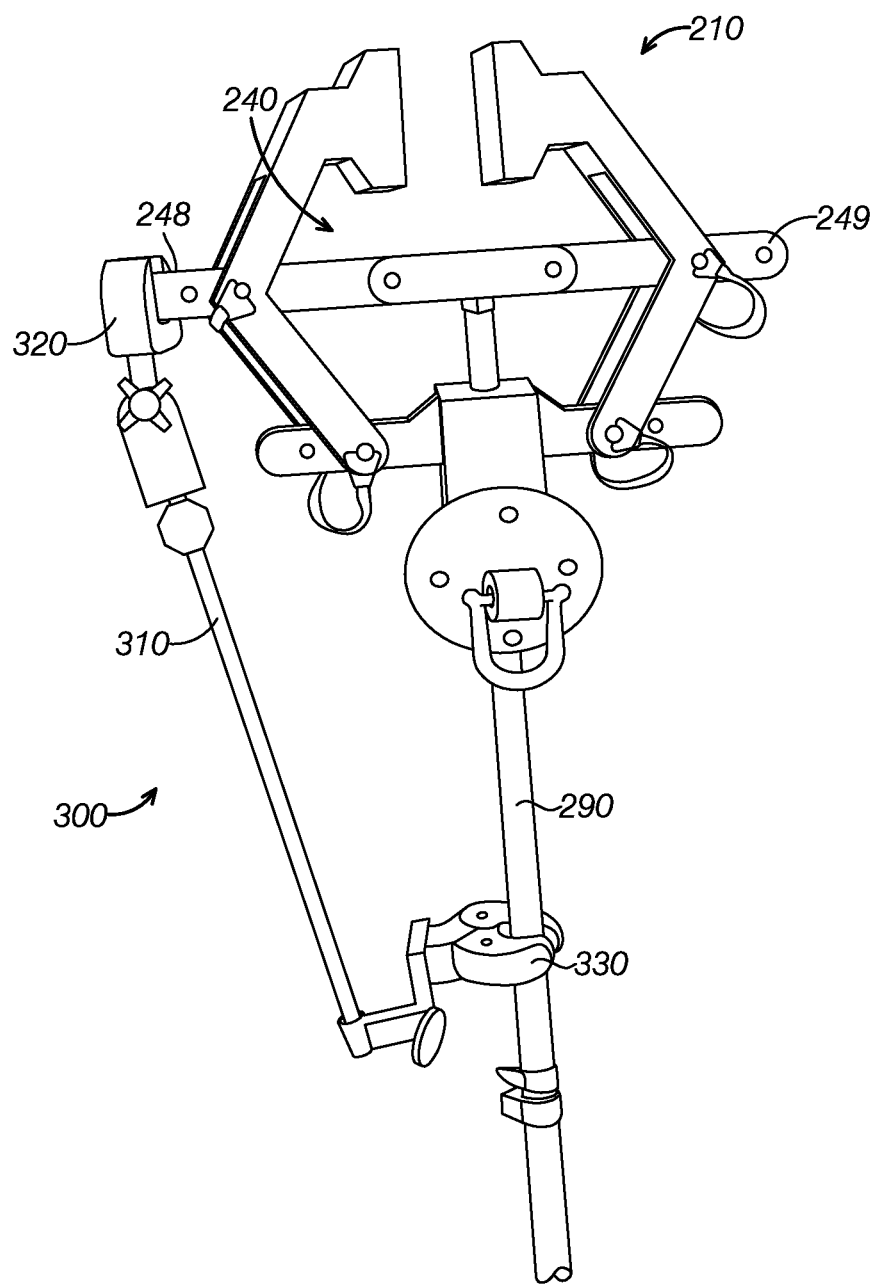
FIG. 3A illustrates a clamp stabilizing system, according to an embodiment.

FIG. 3A illustrates a clamp stabilizing system 300, according to an embodiment. Some of the features in FIG. 3A are the same as or similar to some of the features in FIGS. 1A-2C as noted by same and/or similar reference characters, unless expressly described otherwise. Furthermore, the elements and/or features described regarding FIG. 3A may be the same as and/or similar to other similarly named elements and/or features described and/or illustrated throughout this disclosure.

The clamp stabilizing system 300 (also referenced herein as "the system 300") is configured to stabilize the clamp while the threaded rod 260 of the clamp 210 is inserted into the extension pole 290. In particular, the system 300 stabilizes lateral movement and/or circumferential rotation of the clamp 210 with respect to the extension pole 290 as the user lifts the clamp 210 up to an object via the extension pole 290.

The system 300 extends between the extension pole 290 and a distal end of the first crossbar 240. The system 300 includes a rod 310 and saddle 320 that is releasably coupled to the distal end 248 of the first crossbar 240. Alternatively, the saddle 320 may be releasably coupled to the distal end 249 of the crossbar 240. In various embodiments, the saddle 320 is releasably coupled to a distal end of the first crossbar 240 via a magnetic coupling, a velcro coupling or the like.

The system 300 includes a clamp 330 that is configured to be releasably coupled to the extension pole 290. In various embodiments, the clamp 330 provides a sufficient clamping force to remain clamped to the pole 290. However, the clamping force allows the extension pole 290 to rotate within the clamp 330 and to not allow the rotation of the system 300 while the user is rotating the extension pole 290.

In various embodiments, upon the clamp 210 being clamped to an object, the extension pole 290 is pulled downward and is no longer engaged with the threaded rod 260. Moreover, the system 300 decouples from the clamp 210 and remains attached to the extension pole 290 as the extension pole 290 is decoupled from the clamp 210.

Figure 3B:
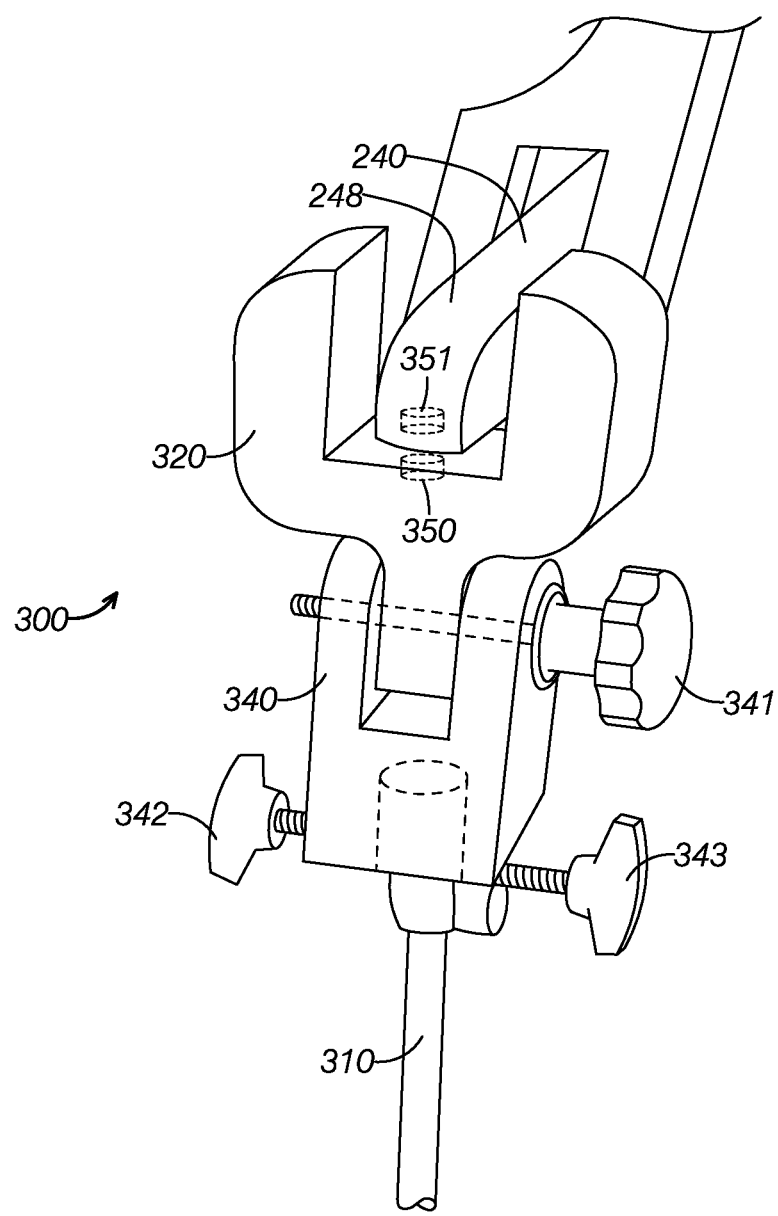
FIG. 3B illustrates a portion of the clamp stabilizing system in FIG. 3A, according to an embodiment.

FIG. 3B illustrates a portion of the clamp stabilizing system 300 in FIG. 3A, according to an embodiment. Some of the features in FIG. 3B are the same as or similar to some of the features in FIGS. 1A-3A as noted by same and/or similar reference characters, unless expressly described otherwise. Furthermore, the elements and/or features described regarding FIG. 3B may be the same as and/or similar to other similarly named elements and/or features described and/or illustrated throughout this disclosure.

The saddle 320 of system 300 includes a magnet 350 that is configured to be magnetically coupled to magnet 351 disposed at the distal end 248 of the first crossbar 240. As such, the system 300 is releasably coupled to the first crossbar 240. In various embodiments, the distal end 249 may also include a magnet similar to magnet 351.

The saddle 320 is releasably coupled to the rod 310 via coupler 340. In one embodiment, the saddle 320 is coupled to the coupler 340 via a screw 341. As such, the saddle 320 may rotate about the axis of the screw 341. The coupler 340 is coupled to the rod via a screw 342. In particular, the coupler 340 may rotate about the axis of the rod 310 to a desired position and be secured in place via the screw 342.

Additionally, the coupler 340 may rotate with respect to the rod 310 via a hinge. A user may desire to rotate the coupler 340 about the hinge to a desired angle and lock the coupler 340 at the desired angle via the screw 343.

Figure 4:
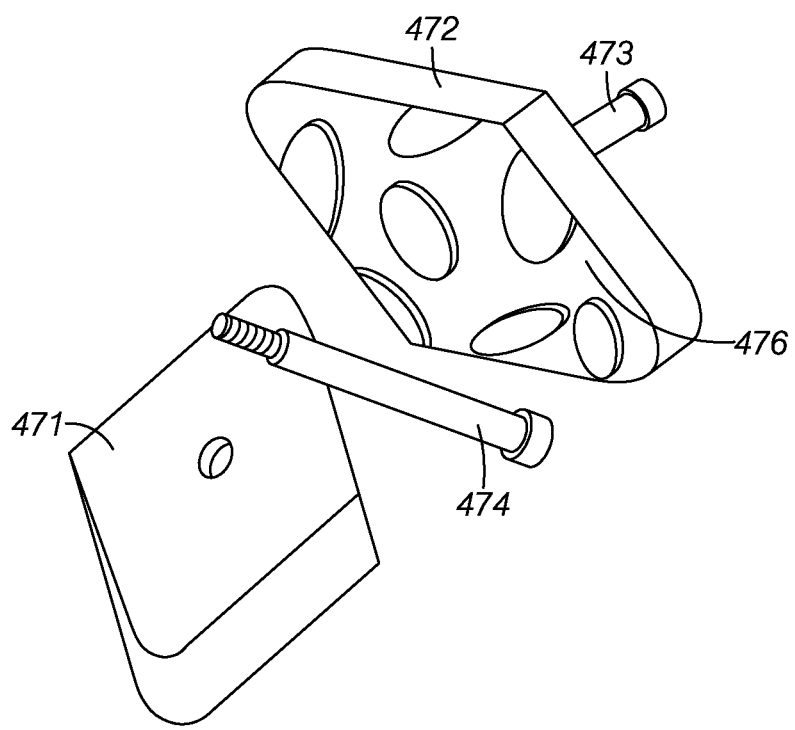
FIG. 4 illustrates a set of gripping pads, according to an embodiment.

FIG. 4 illustrates a set of gripping pads 400, according to an embodiment. Some of the features in FIG. 4 are the same as or similar to some of the features in FIGS. 1A-3B as noted by same and/or similar reference characters, unless expressly described otherwise. Furthermore, the elements and/or features described regarding FIG. 4 may be the same as and/or similar to other similarly named elements and/or features described and/or illustrated throughout this disclosure.

The set of gripping pads 400 includes a first pad 471 configured to be releasably coupled to a first jaw 223 of the clamp 210 via a bold 474 and a second pad 472 configured to be releasably coupled to a second jaw 233 of the clamp 210 via a bolt 473.

A surface of the gripping pads may include any number of materials and/or surface patterns. For example, a surface 476 includes a diamond shaped-pattern to facilitate in gripping an object. The pads 471 and 472 may be any material (e.g., rubber, metal) that facilitates in gripping an object. In one embodiment, the pads 471 and 472 are made of metal and include a spiked surface to grip onto an object (e.g., wood object). In another embodiment, the pads 471 and 472 are made of a material (e.g., rubber) that does not ruin or damage a delicate surface (e.g., glass).

Figure 5:
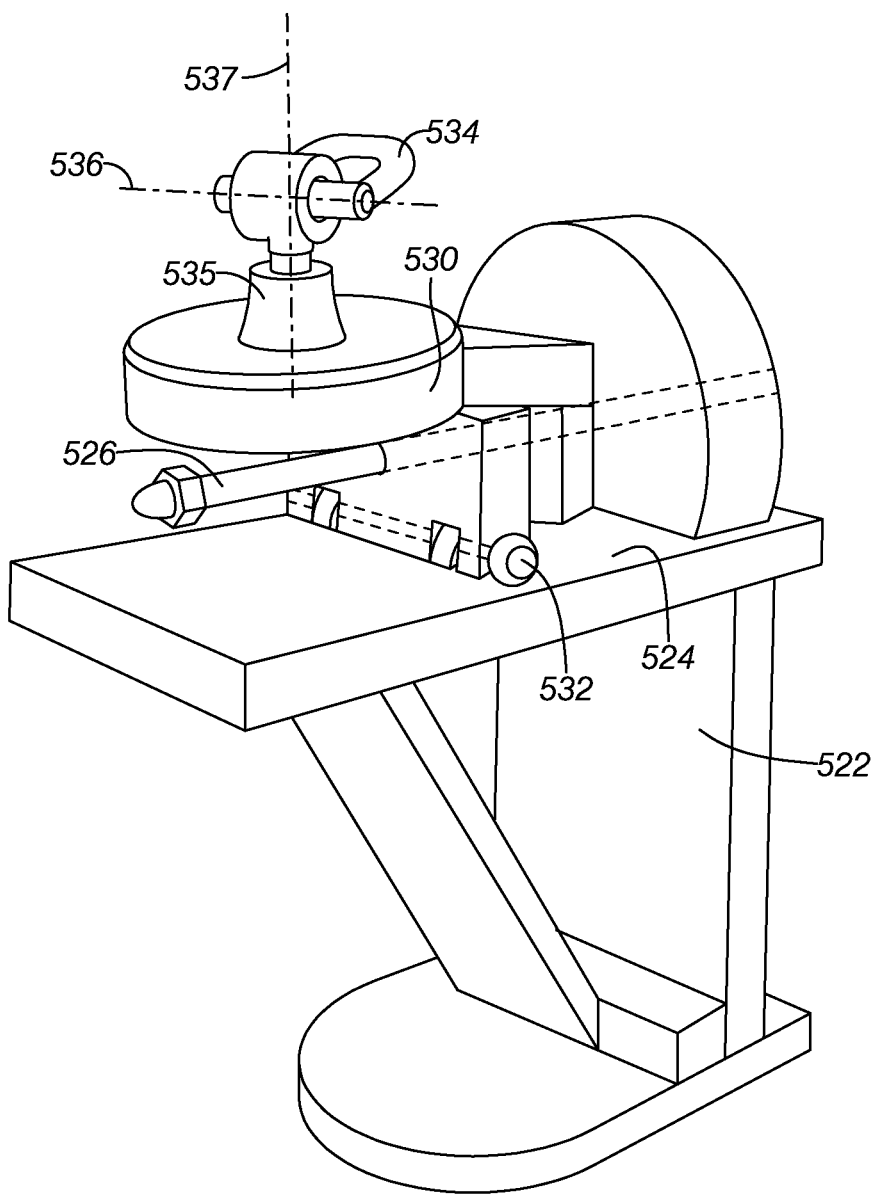
FIG. 5 illustrates a perspective view of a bracket, according to an embodiment.

FIG. 5 illustrates a perspective view of a bracket 520, according to an embodiment. Some of the features in FIG. 5 are the same as or similar to some of the features in FIGS. 1A-4 as noted by same and/or similar reference characters, unless expressly described otherwise. Furthermore, the elements and/or features described regarding FIG. 5 may be the same as and/or similar to other similarly named elements and/or features described and/or illustrated throughout this disclosure.

The bracket 520 includes a base 522. In one embodiment, the base 522 is physically secured to a rail of a ladder. For example, referring to FIG. 1A, a strap 122 straps the base 522 to a rail of the ladder. As such, the bracket 520 is secured to the ladder. The base 522 includes a platform 524 and a rod 526 that extends over and parallel with the platform 524.

The bracket 520 includes a slider 530 that is configured to slide along or translate along the platform 524. In one embodiment, the rod 526 extends through the slider 530. The slider 530 includes a roller 532 that rolls along the platform 524.

The slider 530 includes a swivel 535 that rotates about an axis 537. A ring 534 is coupled to the swivel and may rotate with respect to the swivel 535 about an axis 536. Referring to FIGS. 1B and 5, the ring 534 (e.g., the ring 121) is configured to receive a portion of the strap 140 that extends between the lower bracket 130 and the clamp 110.

The slider 530 may self-align with the clamp 110. For example, the slider 530 may be unaligned (e.g., laterally offset) with the clamp 110. A force may be applied to the slider 530 in response to tension being applied to the strap 140. The force applied to the slider 530 (based on the initial misalignment between the bracket 520 and the clamp 110) causes the slider 530 to travel along the platform 524 and self-align with the clamp 110. That is, when tension is applied to the strap 140, the strap 140 generates a force on the ring 534 and the slider 530 may travel (or slide) along the rod 526 and along the platform 524 via the roller 532.

Figure 6:
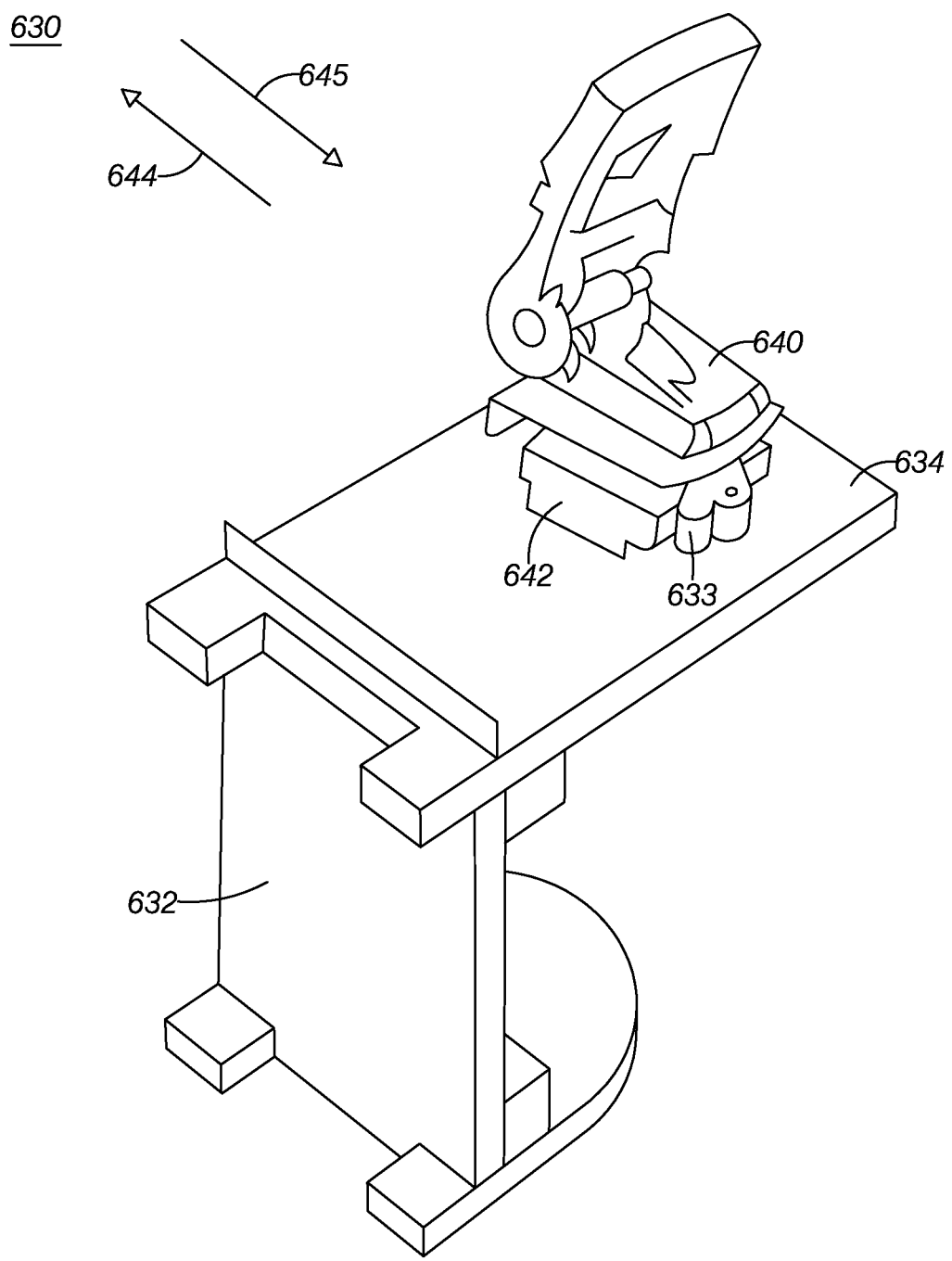
FIG. 6 illustrates a perspective view of a bracket, according to an embodiment.

FIG. 6 illustrates a perspective view of a bracket 630, according to an embodiment. Some of the features in FIG. 6 are the same as or similar to some of the features in FIGS. 1A-5 as noted by same and/or similar reference characters, unless expressly described otherwise. Furthermore, the elements and/or features described regarding FIG. 6 may be the same as and/or similar to other similarly named elements and/or features described and/or illustrated throughout this disclosure.

The bracket 630 includes a base 632. In one embodiment, the base 632 is physically secured to a rail of a ladder. For example, referring to FIG. 1A, a strap 132 straps the base 632 to a rail of the ladder. As such, the bracket 630 is secured to the ladder. The base 632 includes a platform 634.

The bracket 630 includes a ratchet 640 that is configured to receive a strap (e.g., strap 140) and generate tension on the strap. The ratchet 640 is releasably coupled to base 642 where base 642 is coupled to platform 634. As depicted in FIG. 6, the ratchet 640 is facing a first direction 644. That is, the ratchet 640 faces side wall 639 of the platform 634. The ratchet 640 may be released from the base 642 via lever 633. The ratchet 640 may then be re-coupled with the base 642 facing an opposite direction 645. That is, the ratchet 640 may face the side wall 638 of the platform. The changing of direction of the ratchet 640 enables the bracket 630 to be placed on either rail of the ladder (e.g., rail 152 or rail 153).

Figure 7A:
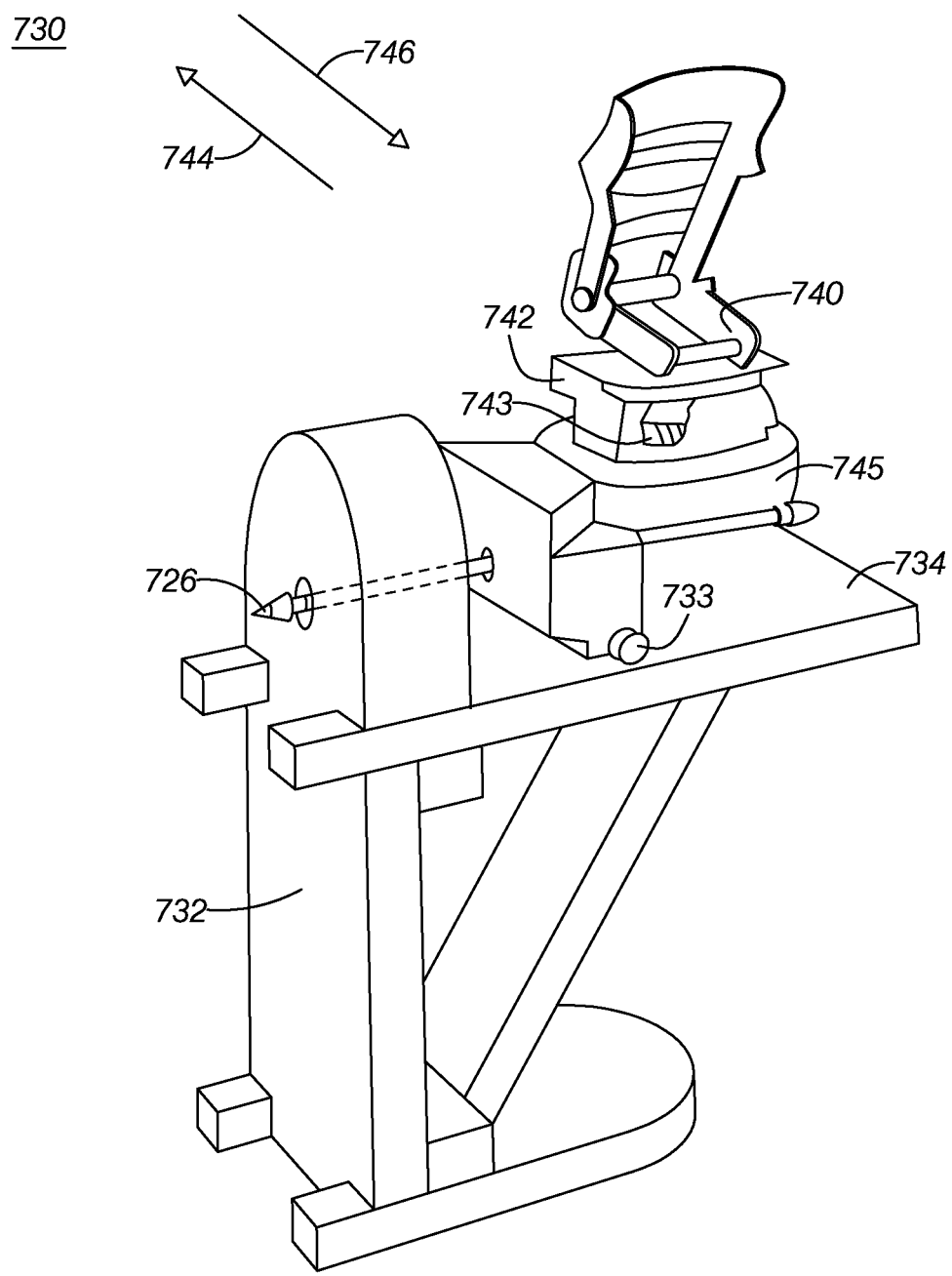
FIG. 7A illustrates a perspective view of a bracket, according to an embodiment.

FIG. 7A illustrates a perspective view of a bracket 730, according to an embodiment. Some of the features in FIG. 7A are the same as or similar to some of the features in FIGS. 1A-6 as noted by same and/or similar reference characters, unless expressly described otherwise. Furthermore, the elements and/or features described regarding FIG. 7 may be the same as and/or similar to other similarly named elements and/or features described and/or illustrated throughout this disclosure.

The bracket 730 includes a base 732. In one embodiment, the base 732 is physically secured to a rail of a ladder. For example, referring to FIG. 1A, a strap 122 straps the base 732 to a rail of the ladder. As such, the bracket 730 is secured to the ladder. The base 732 includes a platform 734 and a rod 726 that extends over and parallel with the platform 734.

The bracket 730 includes a slider 745 that is configured to slide along or translate along the platform 734. In one embodiment, the rod 726 extends through the slider 745. The slider 745 includes a roller 733 that rolls along the platform 734.

The slider 745 may self-align with the clamp 110 and/or bracket 120. For example, the slider 745 may be slightly un-aligned (e.g., laterally offset) with the clamp 110 and/or the bracket 120. A force may be applied to the slider 745 in response to tension being applied to the strap 140 via ratchet 740. The force applied to the slider 745 (based on the initial mis-alignment between the bracket 730 and the clamp 110) causes the slider 745 to travel along the platform 734 and self-align with the clamp 110 and the bracket 120. That is, when tension is applied to the strap 140, the strap 140 generates a force on the ratchet 740 and the slider 745 may travel (or slide) along the rod 726 and along the platform 734 via the roller 733.

The bracket 730 includes a ratchet 740 that is configured to receive a strap (e.g., strap 140) and generate tension on the strap. The ratchet 740 is releasably coupled to a base 742 (also referred to herein as a coupler) where base 742 is coupled to the slider 745. As depicted in FIG. 7. the ratchet 740 is facing a first direction 744. The ratchet 740 may be released from the base 742 via lever 743. The ratchet 740 may then be re-coupled with the base 742 facing an opposite direction 746. The changing of direction of the ratchet 740 enables the bracket 730 to be placed on either rail of the ladder (e.g., rail 152 or rail 153).

Figure 7B:
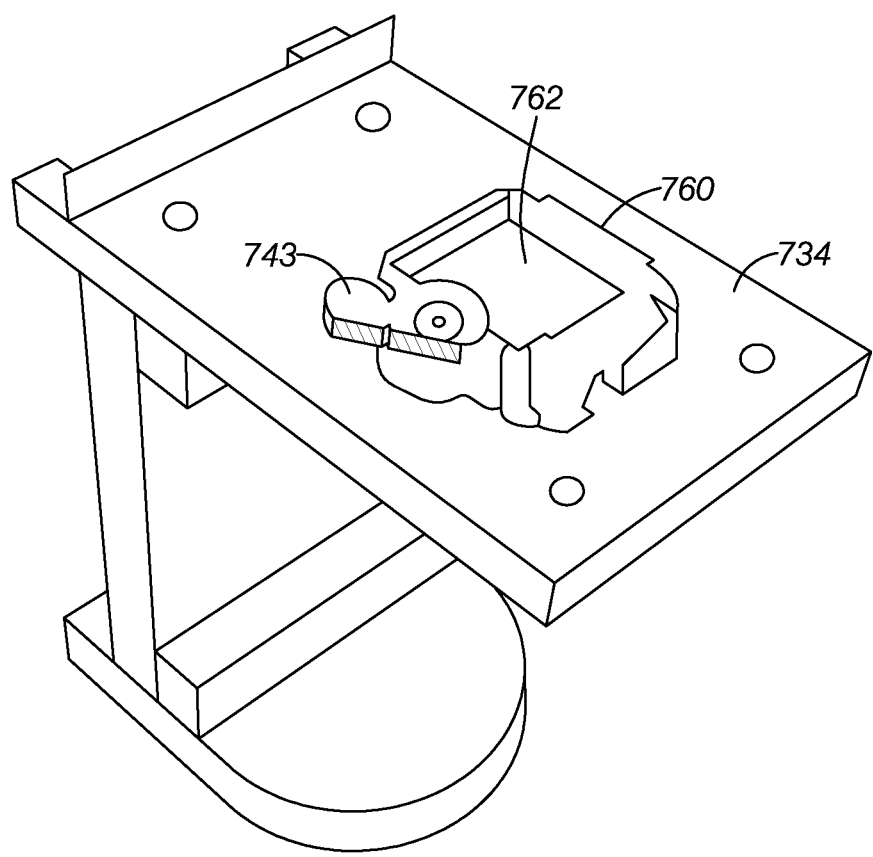
FIG. 7B illustrates a perspective view of a bracket, according to an embodiment.

FIG. 7B illustrates a perspective view of a bracket 732B, according to an embodiment. Some of the features in FIG. 7B are the same as or similar to some of the features in FIGS. 1A-7A as noted by same and/or similar reference characters, unless expressly described otherwise. Furthermore, the elements and/or features described regarding FIG. 7B may be the same as and/or similar to other similarly named elements and/or features described and/or illustrated throughout this disclosure.

The bracket 732B includes coupler 760 (also referred to herein as a base) that matingly couples to the ratchet 740.

That is, the ratchet 740 is releasably coupled to a first coupler 760. For example, a portion of the ratchet 740 is seated into aperture 762. To release the ratchet from the first coupler 760, a user depresses lever 743. Accordingly, the ratchet is released from coupler 760. In various embodiments, referring to FIG. 7A, the bracket 732 includes first coupler 760 (e.g., base 742). For example, the slider 745 includes the first coupler 760.

Figure 7C:
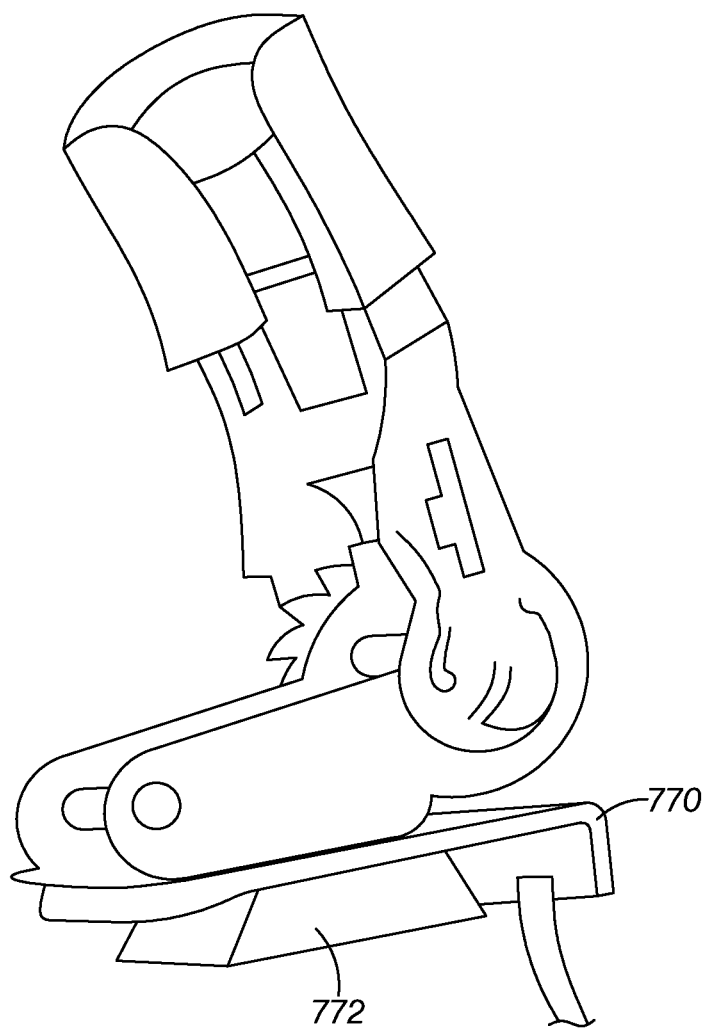
FIG. 7C illustrates a perspective view of a ratchet, according to an embodiment.

FIG. 7C illustrates a perspective view of a ratchet 740, according to an embodiment. Some of the features in FIG. 7C are the same as or similar to some of the features in FIGS. 1A-7B as noted by same and/or similar reference characters, unless expressly described otherwise. Furthermore, the elements and/or features described regarding FIG. 7C may be the same as and/or similar to other similarly named elements and/or features described and/or illustrated throughout this disclosure.

The ratchet 740 includes a base 770 and a coupler 772 coupled to the base. In various embodiments, the coupler 772 is configured to be disposed within the aperture 762. Accordingly, when the coupler 772 is disposed within the aperture 762, the ratchet 740 is releasably coupled to the coupler 760.

Figure 8:
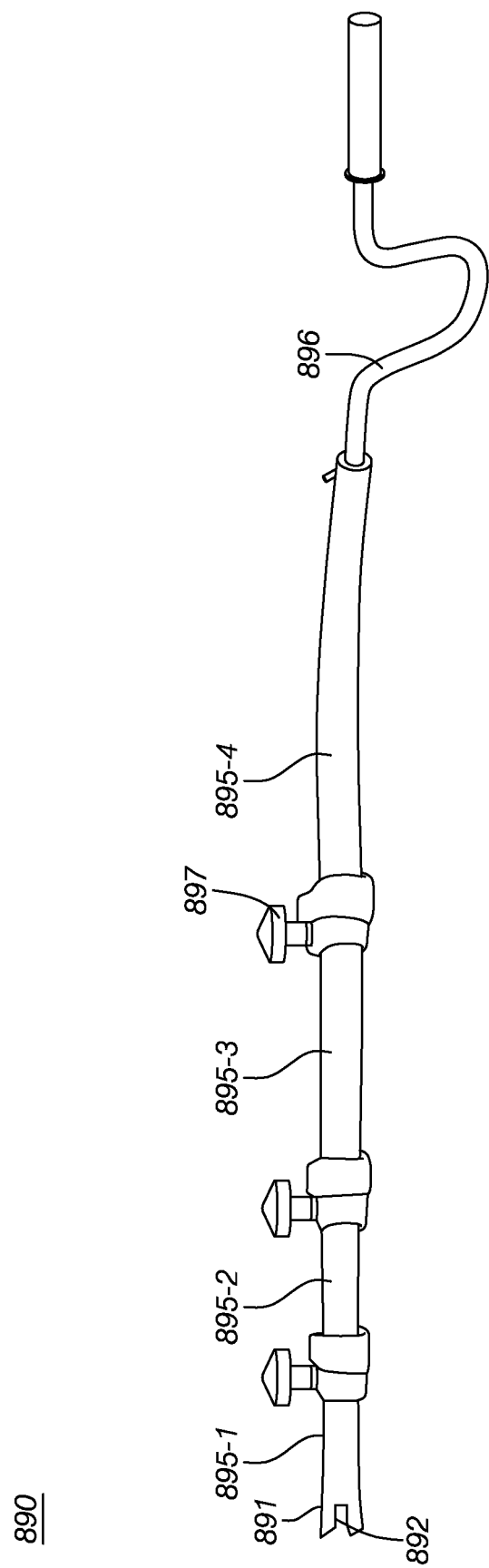
FIG. 8 illustrates an extension pole, according to an embodiment.

FIG. 8 illustrates a perspective view of an extension pole 890, according to an embodiment. Some of the features in FIG. 8 are the same as or similar to some of the features in FIGS. 1A-7 as noted by same and/or similar reference characters, unless expressly described otherwise. Furthermore, the elements and/or features described regarding FIG. 8 may be the same as and/or similar to other similarly named elements and/or features described and/or illustrated throughout this disclosure.

The extension pole 890 includes a distal end 891. The distal end 891 includes an aperture 892 that is configured to receive a wing of a wing nut. As such, referring to FIG. 2C, a user is able to tighten (or untighten) a wing nut 261 by rotating the extension pole. In one embodiment, the distal end 891 is flared to accommodate the body of the wing nut.

The extension pole 890 includes various portions 895 for extending the extension pole 890. For example, the extension pole 890 includes a first portion 895-1, a second portion 895-2, a third portion 895-3, and a fourth portion 895-4. In various embodiments, the extension pole 890 includes one or more portions for the extension of the extension pole 890. The extension pole 890 includes a handle 896 that is releasably coupled to the portion 895-4.

Figure 9:
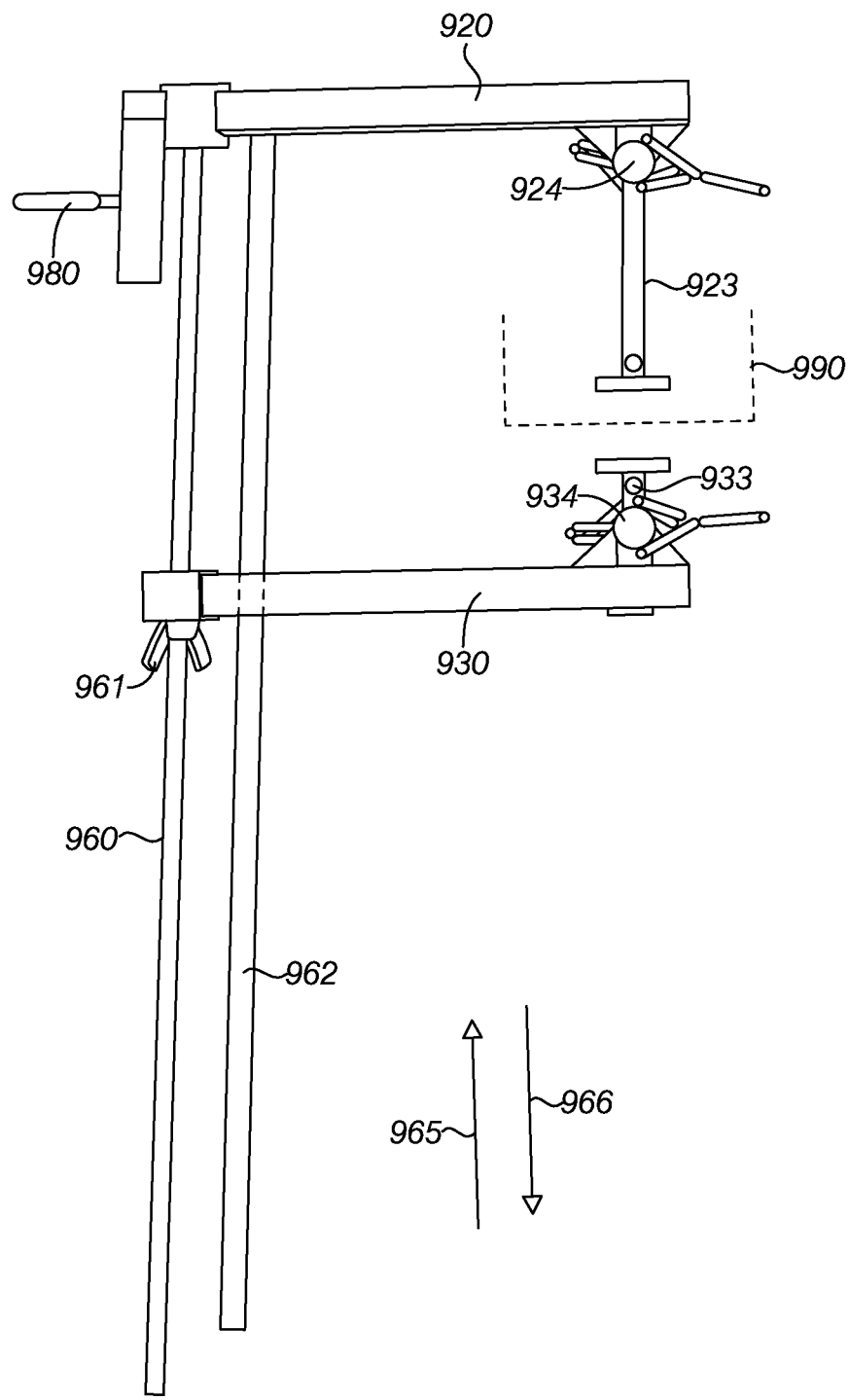
FIG. 9 illustrates a side view of a clamp, according to an embodiment.

FIG. 9 illustrates a side view of a clamp 910, according to an embodiment. Some of the features in FIG. 9 are the same as or similar to some of the features in FIGS. 1A-8 as noted by same and/or similar reference characters, unless expressly described otherwise. Furthermore, the elements and/or features described regarding FIG. 9 may be the same as and/or similar to other similarly named elements and/or features described and/or illustrated throughout this disclosure.

The clamp 910 is configured to clamp to a gutter 990. The clamp 910 includes a first arm 920 and a second arm 930 opposite the first arm 920. The first arm 920 includes a first jaw 923 that extends perpendicularly from the first arm 920. The first jaw 923 is releasably coupled to the first arm 920 via a pin 924.

The second arm 930 includes a second jaw 933 that extends perpendicularly from the second arm 930. The second jaw 933 is releasably coupled to the second arm 930 via a pin 934.

The clamp 910 includes a threaded rod 960 that is rotatably coupled to the first arm 930. The threaded rod 960 passes through (and does not threadably engage) the second arm 930.

In one embodiment, a nut 961 (e.g., a wing nut) is threadably engaged with the threaded rod 960. As the nut travels along the threaded rod 960, in the direction 965, the nut 961 abuts the second arm 930. While the nut 961 buts the second arm 930 and continues to travel along the threaded rod, in direction 965, the second arm 930 moves in the direction 265. As a result, the second jaw 933 is drawn towards the first jaw 923 to clamp onto a gutter 990 located between the first jaw 923 and the second jaw 933. Additionally, the clamp 910 includes a rod 962 that is coupled to the first arm 920 and passes through the second arm 930. The rod 962 maintains alignment and structural stability between the first arm 920 and the second arm 930.

To loosen the clamp 910 or, in other words, to unclamp the clamp 910 from the gutter 990 between the first jaw 923 and the second jaw 933, the nut 961 is rotated in an opposite direction such that it travels in the direction 966 along the threaded rod 960. As such, the first jaw 923 and the second jaw 933 are drawn away from one another.

Figure 10:
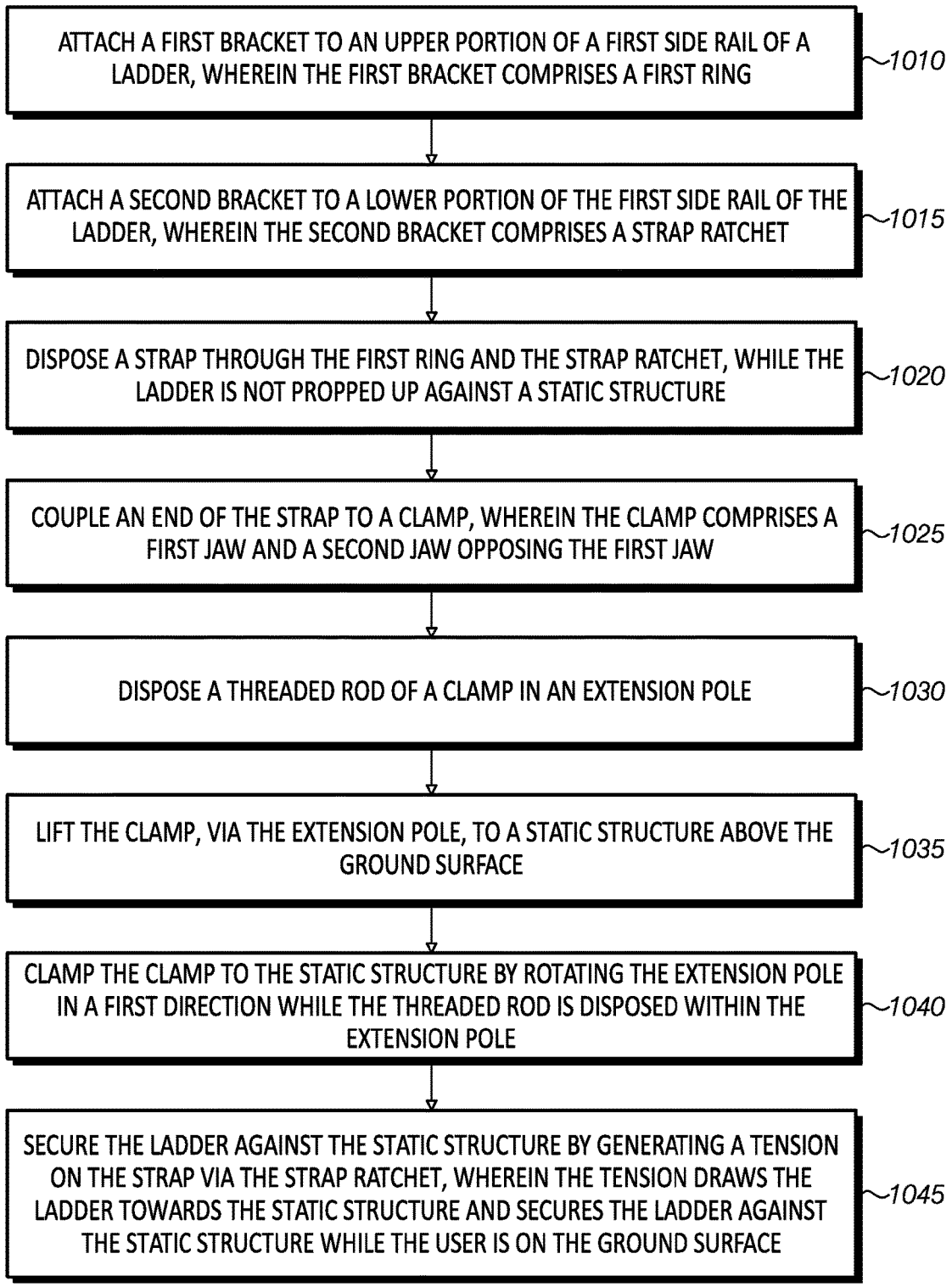
FIG. 10 illustrates a method of stabilizing a ladder, according to an embodiment.

FIG. 10 depicts a method 1000 of stabilizing a ladder, according to an embodiment. The method 1000 includes attaching a first bracket to an upper portion of a first side rail of a ladder, wherein the first bracket comprises a first ring (step 1010). For example, referring to at least FIG. 1A, while the ladder 150 is not propped up against the roof 160 (or while the ladder 150 is laying on the ground), the first bracket 120 is affixed to the side rail 152 of the ladder 150.

The method 1000 includes attaching a second bracket to a lower portion of the first side rail of the ladder, wherein the second bracket comprises a strap ratchet (step 1015). For example, referring to at least FIG. 1A, while the ladder 150 is not propped up against the roof 160 (or while the ladder 150 is laying on the ground), the second bracket 130 is affixed to the side rail 152 of the ladder 150.

The method 1000 includes disposing a strap through the first ring and the strap ratchet, while the ladder is not propped up against a static structure (step 1020). For example, referring to at least FIG. 1A, while the ladder 150 is not propped up against the roof 160 (or while the ladder 150 is laying on the ground), the strap 140 (e.g., a rope, webbing, etc.) passed through the ring 121 of the first bracket 120 and coupled to the strap ratchet 131 of the second bracket 130.

The method 1000 includes coupling an end of the strap to a clamp, wherein the clamp comprises a first jaw and a second jaw opposing the first jaw (step 1025). For example, referring to at least FIG. 1A, while the ladder 150 is not propped up against the roof 160 (or while the ladder 150 is laying on the ground), a hook 141 of the strap 140 is coupled to a ring 111 of the clamp 110.

The method 1000 includes disposing a threaded rod of a clamp in an extension pole (step 1030). For example, referring to at least FIG. 2B, a threaded rod is disposed into an end of the extension pole 290. As such, a user may lift the clamp 210 via the extension pole 290 to an object above his/her head (step 1035).

The method 1000 includes clamping the clamp to the static structure by rotating the extension pole in a first direction while the threaded rod is disposed within the extension pole (step 1040). For example, referring to at least FIG. 1A, the user may rotate the extension pole and clamp the clamp 110 to a rafter of the roof 160.

The method 1000 includes securing the ladder against the static structure by generating a tension on the strap via the strap ratchet. The tension draws the ladder towards the static structure and secures the ladder against the static structure while the user is on the ground surface (step 1045). For example, referring to at least FIG. 1A, the user actuates the ratchet 131 to generate tension in the strap 140. In particular, in response to the strap 140 becoming taut, the ladder 150 is pulled towards the roof 160. As such, the ladder 150 is stabilized against the roof 160.

It is to be understood that the above description is intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The disclosure above encompasses multiple distinct embodiments with independent utility. While these embodiments have been disclosed in a particular form, the specific embodiments disclosed and illustrated above are not to be considered in a limiting sense as numerous variations are possible. The subject matter of the embodiments includes the novel and non-obvious combinations and sub-combinations of the various elements, features, functions and/or properties disclosed above and inherent to those skilled in the art pertaining to such embodiments. Where the disclosure or subsequently filed claims recite "a" element, "a first" element, or any such equivalent term, the disclosure or claims is to be understood to incorporate one or more such elements, neither requiring nor excluding two or more such elements.

Applicant(s) reserves the right to submit claims directed to combinations and sub-combinations of the disclosed embodiments that are believed to be novel and non-obvious. Embodiments embodied in other combinations and sub-combinations of features, functions, elements and/or properties may be claimed through amendment of those claims or presentation of new claims in the present application or in a related application. Such amended or new claims, whether they are directed to the same embodiment or a different embodiment and whether they are different, broader, narrower or equal in scope to the original claims, are to be considered within the subject matter of the embodiments described herein.

The invention claimed is:

1. A system, comprising:
    a clamp configured to clamp to a static structure, the clamp comprising:
        a first arm comprising a first jaw; and
        a second arm comprising a second jaw opposing the first jaw;
        a threaded rod coupled to the first arm and the second arm, wherein:
            the threaded rod is configured to be substantially vertical when the clamp is clamped to the static structure; and
            a portion of the threaded rod extends from the clamp;
        a nut threadably coupled to the portion of the threaded rod, wherein:
            the clamp is configured to, in response to the nut being rotated about the threaded rod, urges the first jaw towards the second jaw such that the static structure is clamped between the first jaw and the second jaw; and
            the nut is configured to be tightened by a user, while the user is on a ground surface;
    a first ring configured to be coupled with a first end of a strap;
    a first bracket comprising:
        a first base; and
        a first platform, wherein:
            the first base is configured to be releasably affixed to an upper portion of a first side rail of a base station of an extension ladder; and
            the first platform extends perpendicularly from the first side rail; and
        a first slider slidable engaged with the first platform; and
        a second ring coupled to the first slider, wherein the strap is configured to pass through the second ring; and
    a second bracket comprising:
        a second base; and
        a second platform, wherein:
            the second base is configured to be releasably affixed to a lower portion of the first side rail of the base station of the extension ladder; and
            the second platform extends perpendicularly from the first side rail; and
        a second slider slidably slidable engaged with the second platform; and
        a strap ratchet coupled to the second slider, wherein:
            the strap is configured to pass through the strap ratchet; and
            in response to the strap ratchet creating tension to the strap:
                the first slider is configured to translate along the first platform; or
                the second slider is configured to translate along the second platform such that the second ring of the first slider, and the first ring are substantially laterally aligned with one another.

2. The system of claim 1, wherein the static structure is a rafter or a gutter.

3. The system of claim 1, wherein:
    the first end of the strap is configured to be coupled to the first ring prior to the clamp being clamped to the static structure; or
    the strap is configured to pass through the second ring prior to the clamp being clamped to the static structure.

4. The system of claim 1, wherein the first ring or the second ring is configured to rotate about a first axis and a second axis, wherein the first axis is perpendicular to the second axis.

5. The system of claim 1, wherein the strap ratchet is configured to be:
    facing a first direction while the second bracket is releasably coupled to a first side rail of the second platform; and
    facing a second direction while the second bracket is releasably coupled to a second side rail of the second platform, wherein the first direction is opposite the second direction.

6. The system of claim 1, wherein:
    the first bracket comprises a first rod extending over the first platform and the first slider is slidably engaged with the first rod; and
    the second bracket comprises a second rod extending over the second platform and the second slider is slidably engaged with the second rod.

7. The system of claim 1, wherein:
the second slider comprises a first coupler;
the strap ratchet comprises a second coupler; and
the second coupler is releasably coupled to the first coupler such that the strap ratchet is releasably coupled to the second slider.

8. The system of claim 1, further comprising an extension pole comprising an open distal end configured to receive the portion of the threaded rod that extends from the clamp while the user is on the ground surface.

9. The system of claim 8, wherein the open distal end comprises:
a first aperture configured to receive a first wing of the nut; and
a second opposite aperture configured to receive a second wing of the nut, wherein, in response to the user rotating the extension pole from the ground surface, the nut is rotated along the portion of the threaded rod.

* * * * *